US011152838B2

(12) United States Patent
Pétursson et al.

(10) Patent No.: US 11,152,838 B2
(45) Date of Patent: Oct. 19, 2021

(54) MEASURING TRANSDUCER CURRENTS IN A WIND TURBINE GENERATOR

(71) Applicant: VESTAS WIND SYSTEMS A/S, Aarhus (DK)

(72) Inventors: Karl Axel Pétursson, Hadsten (DK); Lars Rohrmann Andersen, Hadsten (DK); John Bengtson, Århus (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 150 days.

(21) Appl. No.: 16/472,957

(22) PCT Filed: Dec. 13, 2017

(86) PCT No.: PCT/DK2017/050424
§ 371 (c)(1),
(2) Date: Jun. 24, 2019

(87) PCT Pub. No.: WO2018/113876
PCT Pub. Date: Jun. 28, 2018

(65) Prior Publication Data
US 2019/0372431 A1 Dec. 5, 2019

(30) Foreign Application Priority Data
Dec. 22, 2016 (DK) .............................. PA201671034

(51) Int. Cl.
*H02K 7/18* (2006.01)
*F03D 17/00* (2016.01)
(Continued)

(52) U.S. Cl.
CPC ........... *H02K 7/1838* (2013.01); *F03D 17/00* (2016.05); *H02P 9/02* (2013.01); *F05B 2260/80* (2013.01);
(Continued)

(58) Field of Classification Search
USPC ...................................... 324/76.11
See application file for complete search history.

(56) References Cited

U.S. PATENT DOCUMENTS

2010/0138060 A1* 6/2010 Gao ........................ F03D 17/00
700/287
2015/0123676 A1* 5/2015 Lu .......................... G01R 31/52
324/551

FOREIGN PATENT DOCUMENTS

CN           2686931 Y     3/2005
CN         102022266 A    4/2011
(Continued)

OTHER PUBLICATIONS

Chinese Office Action for Applicatoin No. 201780079877.6 dated Mar. 5, 2020.
(Continued)

*Primary Examiner* — Farhana A Hoque
(74) *Attorney, Agent, or Firm* — Patterson + Sheridan, LLP

(57) ABSTRACT

A method of measuring transducer currents in a wind turbine generator control system is described. The method comprises selectively activating a set of one or more transducers in a group of transducers, taking a first measurement of the current through the group of transducers, selectively activating a different set of one or more transducers in the group of transducers, and taking a second measurement of the current through the group of transducers.

8 Claims, 3 Drawing Sheets

(51) Int. Cl.
*H02P 9/02* (2006.01)
*G08B 21/18* (2006.01)
(52) U.S. Cl.
CPC ........ *F05B 2270/80* (2013.01); *G08B 21/187* (2013.01)

(56) References Cited

FOREIGN PATENT DOCUMENTS

| | | | |
|---|---|---|---|
| CN | 103807095 | A | 5/2014 |
| EP | 1906192 | A2 | 4/2008 |
| EP | 2048720 | A2 | 4/2009 |
| EP | 2535570 | A2 | 12/2012 |
| WO | 2008074324 | A2 | 6/2008 |
| WO | 2012000504 | A1 | 1/2012 |
| WO | 2012097825 | A1 | 7/2012 |
| WO | 2018113876 | A1 | 6/2018 |

OTHER PUBLICATIONS

Chinese Office Action for Application No. 201780079877.6 dated Nov. 10, 2020.
PCT Written Opinion of the International Searching Authority for Application No. PCT/DK2017/050424 dated Mar. 16, 2018.
PCT International Search Report for Application No. PCT/DK2017/050424 dated Mar. 16, 2018.
Danish Search Report for Application No. PA 2016 71034 dated May 18, 2017.

\* cited by examiner

MEASURING TRANSDUCER CURRENTS IN A WIND TURBINE GENERATOR

FIELD OF THE INVENTION

The present invention relates to a method and apparatus for measuring transducer currents in a wind turbine generator.

BACKGROUND TO THE INVENTION

A typical wind turbine comprise a fixed tower which stands on the ground or sea bed, and a nacelle which rests on the top of the tower and carries a turbine shaft, a gearbox, a brake, a generator, a blade pitch controller which controls the angle of the turbine blades, and yaw drives which control the position of the wind turbine relative to the wind. Turbine blades are mounted to the turbine shaft externally of the nacelle. The turbine blades cause the shaft to rotate under the influence of wind, which in turn drives the generator to generate electrical power.

The overall operation of a wind turbine is controlled by a control system. The control system comprises sensors for determining the current status of the turbine equipment and operation, and the local environment, a processor for handling the outputs of those sensors, and actuators for controlling turbine operation. It will be appreciated that the sensors and actuators (transducers) may fail completely, become faulty, or generally degrade over time. At present, if one or more transducers fail, the control system as a whole may generate a fault status notification, the wind turbine generator shut down, and an engineer sent out to identify the fault and repair it.

It is against this background that the invention has been devised.

SUMMARY OF THE INVENTION

In a first aspect, the invention provides a method of measuring transducer currents in a wind turbine generator control system, the method comprising:
  selectively activating a set of one or more transducers in a group of transducers;
  taking a first measurement of the current through the group of transducers;
  selectively activating a different set of one or more transducers in the group of transducers; and
  taking a second measurement of the current through the group of transducers.

In this way, detailed diagnosis of which particular transducer has failed becomes possible. From a maintenance and repair perspective, this means that an engineer called out to the wind turbine generator to fix a fault is aware of the nature of the fault, and is therefore able to bring the correct spare parts and tools to repair the control system.

Each of the transducers may be either a sensor or an actuator. A single current measurement device may be connected to the group of transducers.

The method may comprise activating then deactivating each of the transducers in the group individually in turn so that only a single transducer is activated at a time, and measuring the current across the group as each transducer is activated.

Alternatively, the method may comprise activating a selected transducer in the group while keeping previously activated transducers active, and measuring a difference in the current measurement associated with activating the selected transducer.

Alternatively, the method may comprise deactivating a selected transducer in the group while keeping previously activated transducers active, and measuring a difference in the current measurement associated with deactivating the selected transducer.

Electrical power may be provided to the transducers via switching circuitry, the switching circuitry comprising an output to each of the transducers. The current measurement device may be provided at the input side of the switching circuitry. In this case, selectively activating a transducer may comprise switching on the output of the switching circuitry which is connected to that transducer.

In a second aspect, the invention provides a diagnostic apparatus for measuring transducer currents in a wind turbine generator control system, the apparatus comprising:
  switching circuitry, for selectively activating and deactivating transducers in a group of transducers; and
  a current measurement device, for measuring the current through the group of transducers; wherein
  the switching circuitry is configured to selectively activate a first set of one or more of the transducers in the group, whereupon the current measurement device takes a first measurement of the current through the group of transducers while the first set of transducers is activated; and
  the switching circuitry is further configured to selectively activate a second, different, set of one or more transducers in the group of transducers, whereupon the current measurement device takes a second measurement of the current through the group of transducers while the second set of transducers is activated.

The switching circuitry may receive electrical power for operating the transducers, and comprise an output to each of the transducers, with the current measurement device being provided at the input side of the switching circuitry. In this case, the switching circuitry selectively activates a transducer by switching on the output of the switching circuitry which is connected to that transducer.

The current measurement device and the switching circuitry may be considered to form a first sensor diagnostic group, and the apparatus may further comprise one or more further sensor diagnostic groups each comprising a current measurement device and switching circuitry for measuring the current through transducers of a further group of transducers.

Other aspects of the invention include a wind turbine control system comprising the diagnostic apparatus set out above, a wind turbine generator comprising such a wind turbine control system, and a computer program product carrying a computer program for performing the above method.

Generally, the present techniques apply equally to both sensors and actuators as forms of transducer. Accordingly, these terms are often used interchangeably herein.

DETAILED DESCRIPTION OF EMBODIMENTS OF THE INVENTION

Figure 1:
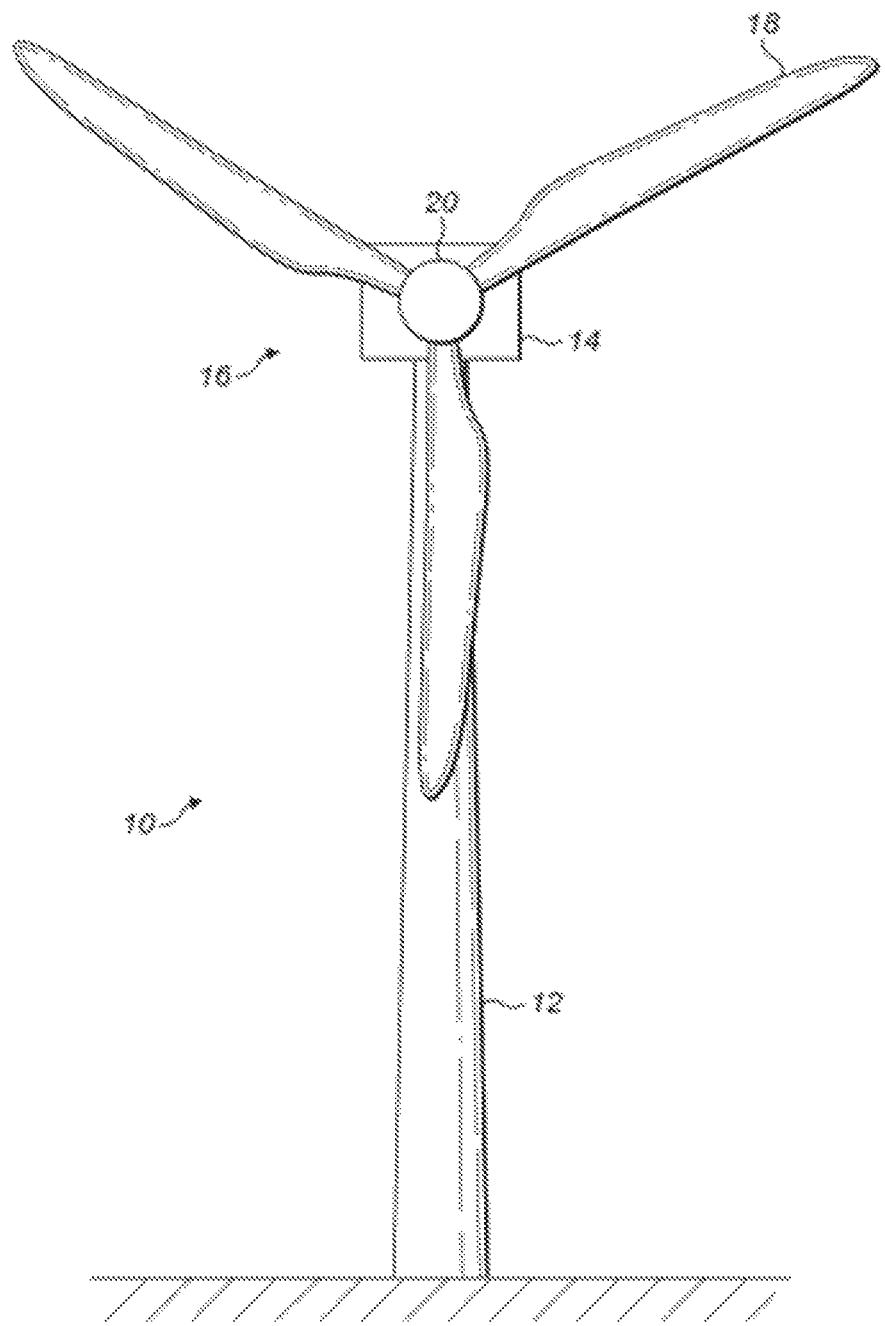
FIG. 1 is a schematic drawing of a wind turbine generator.

FIG. 1 shows a wind turbine 10 comprising a tower 12 supporting a nacelle 14 to which a rotor 16 is mounted. The rotor 16 comprises a plurality of wind turbine blades 18 that extend radially from a central hub 20. In this example, the rotor 16 comprises three blades 18. As discussed above, the pitch (angle of attack with respect to the wind) of the wind turbine blades 18 can be adjusted by a blade pitch controller (not shown), while the yaw of the nacelle 14 can be adjusted by a yaw drive (not shown) to face generally into the wind. The rotor 16 is mounted on a main bearing (not shown), which permits the rotor to rotate freely about its axis. The wind turbine blades 18 are each mounted to the rotor via blade bearings (not shown), which permit the blade 18 to rotate about their longitudinal axis to adjust their pitch. It will be understood that many such wind turbines can be established in a site, or wind farm, covering an area of several square kilometres.

The overall operation of the wind turbine 10 is controlled by a control system. Part of such a control system is shown in FIG. 2.

Figure 2:
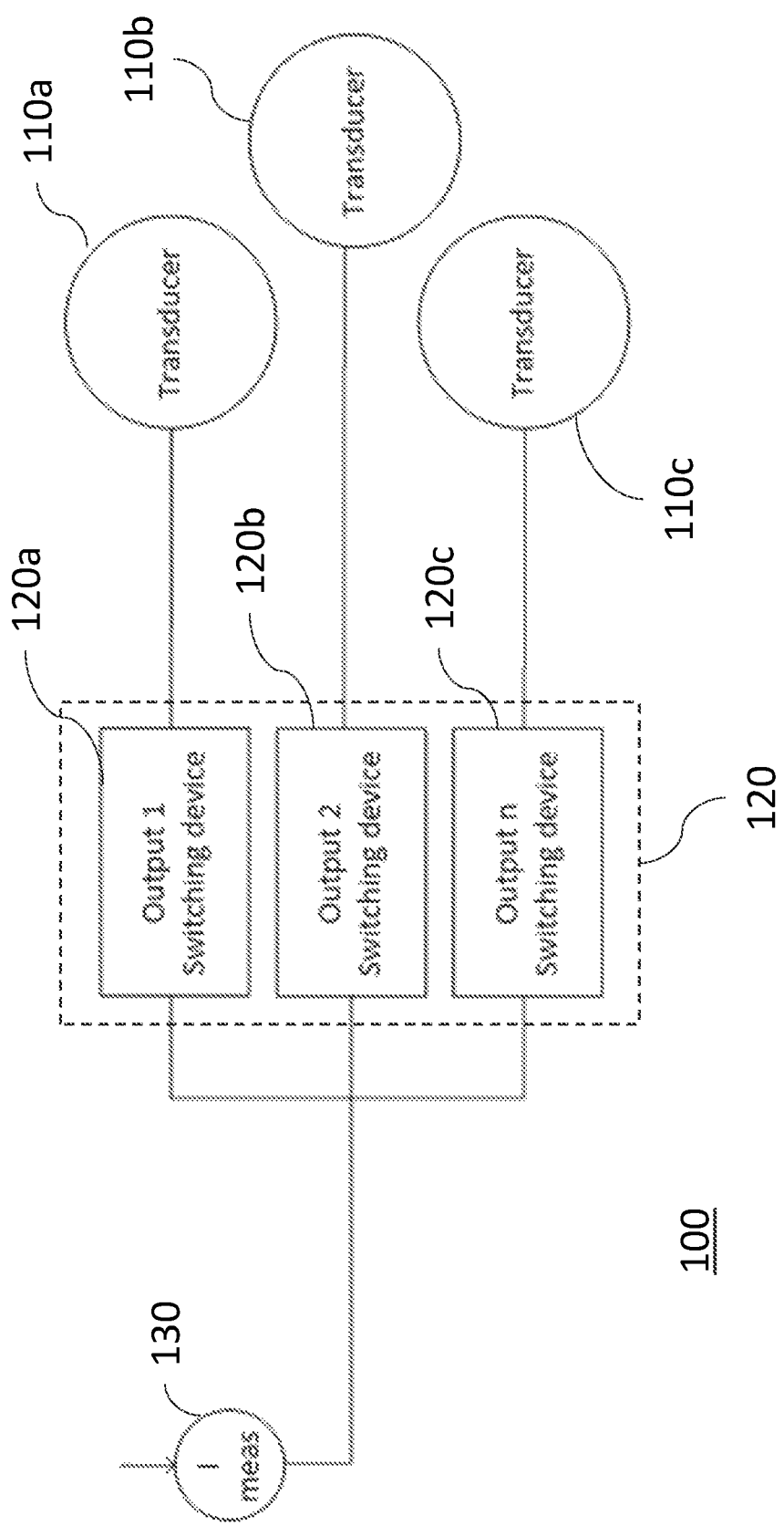
FIG. 2 is schematic drawing of a sensor control and diagnosis system.

In FIG. 2, an example wind turbine generator control system 100 can be seen to comprise transducers 110*a*, 110*b*, 110*c*. The transducers may be sensors for determining the current status of the turbine equipment and operation, and the local environment, or actuators for controlling turbine operation. It will be understood that in a real control system a large number of transducers are provided, whereas in the described example we refer to only 3 transducers for the sake of simplicity. The control system 100 also comprises switching circuitry 120 which serves two purposes. Firstly, the switching circuitry 120 provides electrical power to the transducers 110*a*, 110*b*, 110*c*. Secondly, the switching circuitry 120 is able to selectively activate and deactivate the transducers 110*a*, 110*b*, 110*c* in order that the present current measurement technique may be performed. The switching circuitry 120 itself comprises output switching devices 120*a*, 120*b* and 120*c*—that is, one output switching device for each transducer in the group. More specifically, the switching device 120*a* is able to selectively provide electrical power to the transducer 110*a*, the switching device 120*b* is able to selectively provide electrical power to the transducer 110*b* and the switching device 120*c* is able to selectively provide electrical power to the transducer 110*c*. The control system 100 also comprises a current measurement device 130. In particular, a single current measurement device 130 is provided, at the input of the switching circuitry 120, for the whole group of transducers 110*a*, 110*b*, 110*c*. In other words, a single current measurement device measures the current through the whole group of transducers, rather than a single current measurement device being provided for each transducer. The present technique seeks to establish the current consumption of each individual transducer (in a group of transducers) connected to the control system in a wind turbine generator without requiring a current measurement device for each transducer. Groups of transducers are therefore provided with a single current measurement and the ability to turn on and off the output to each individual transducer (using the switching circuitry 120).

Various transducer activation and deactivation strategies can then be used to determine the current through individual transducers. For example, each of the transducers in the group may be activated and then deactivated individually in turn so that only a single transducer is activated at a time, with the current through the group being measured as each transducer is activated. In this case, the current through the group will be the current through the selected transducer (since no other transducers within the group are active at the time of the current measurement)—permitting direct measurement of the current through that transducer. In another example a selected transducer in the group may be activated while keeping previously activated transducers active, with the current through the group being measured before and after the activation of the selected transducer. In this case, a difference in the current measurement associated with activating the selected transducer is determined—by measuring the current before and after activation and comparing the two current measurements. In yet another example, a selected transducer in the group may be deactivated while keeping previously activated transducers active, with the current through the group being measured before and after the deactivation of the selected transducer. In this case, a difference in the current measurement associated with deactivating the selected transducer is determined—by measuring the current before and after deactivation and comparing the two current measurements. In the latter two examples it will be appreciated that the current through the selected transducer will be the difference between the current measurements made before and after activation/deactivation.

Figure 3:
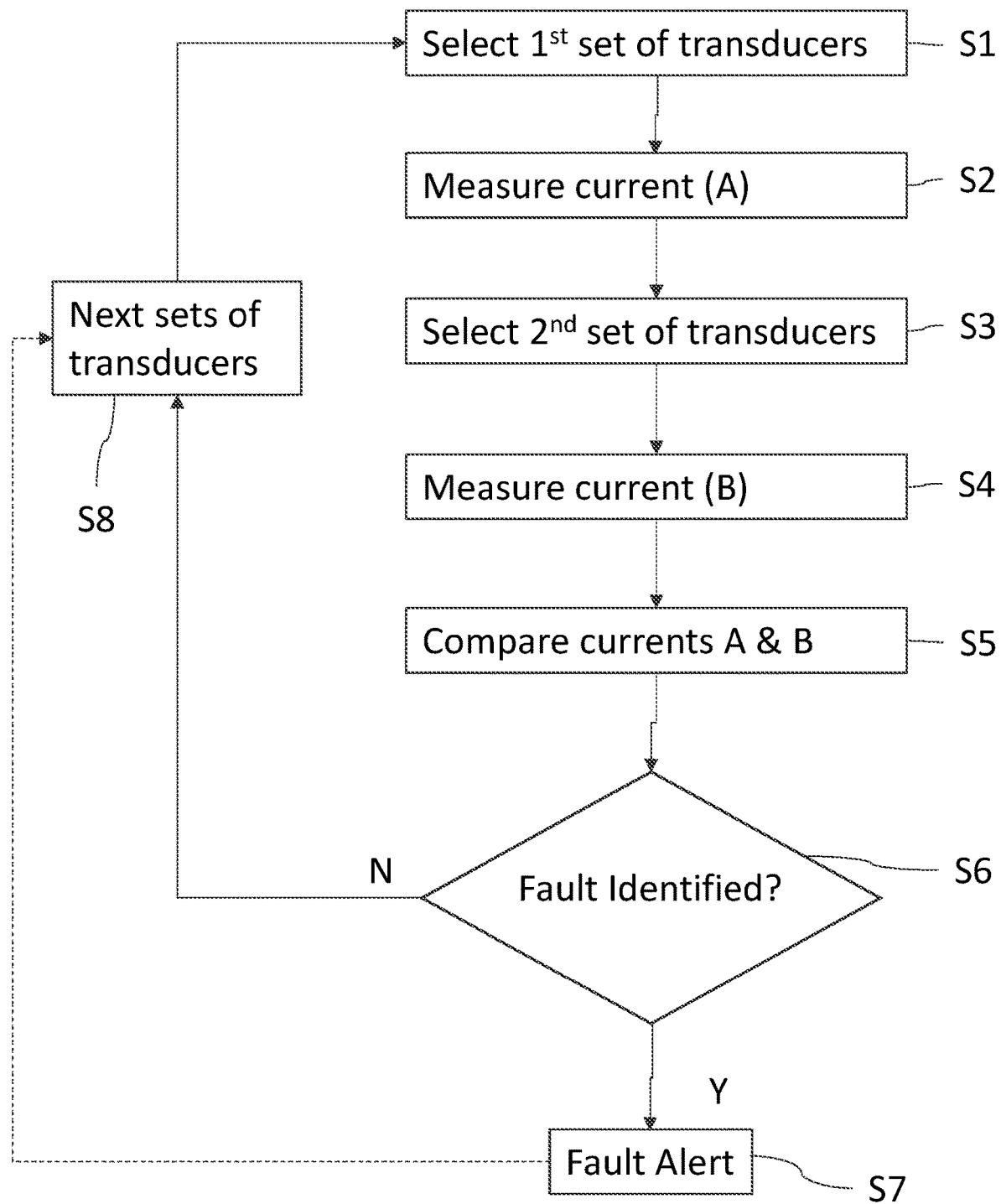
FIG. 3 is a schematic flow diagram of a current measurement method.

Referring to FIG. 3, an example current measurement strategy is illustrated by way of a flow diagram. At a step S1, a first set of transducers in a group of transducers is selected, and activated. At a step S2, the current A through the whole group of transducers (which in practice will be through only those transducers selected and activated at the step S1) is measured. Then, at a step S3 a second set of transducers is selected and activated. The second set will be different to the first set, and may or may not include some of the same transducers. Usually, one of the first and second sets will include all of the transducers of the other of the first and second sets. For example, referring to FIG. 2 the first set may consist of the transducers 110*a* and 110*b*, while the second set may consist of the transducers 110*a*, 110*b* and 110*c*. At a step S4, a current B is measured again through the whole group of transducers (which in practice will be through only those transducers selected and activated at the step S3). At a step S5, the current A measured at the step S2 and the current B measured at the step S4 are compared. The difference A-B or B-A may be determined, this difference representing the current through a particular transducer or a subset of transducers. Returning to the example where the first set of transducers consists of transducers 110*a* and 110*b* and the second set of transducers consists of transducers 110*a*, 110*b* and 110*c*, the difference between the current A and the current B will represent the current flowing through the transducer 110*c* (since the other transducers are common to both sets of transducers).

At a step S6 it is determined whether a fault is identified. A fault may be identified for example where the inferred current is not at an expected level for the transducer under test (for example if an overcurrent is detected, or if no current is detected). If a fault is identified then a fault alert may be generated at a step S77, whereupon the process evaluates the current through another transducer by selecting different steps of transducers at a step S8. If no fault is identified at the step S6 then the process simply progresses directly to the step S8. It will be appreciated that, at the step S8, either or both of the first and second sets of transducers may be changed.

It will be appreciated from the above that to establish the current consumption of each individual transducer connected to a control system in a wind turbine generator, a new current measurement strategy is provided. Groups of outputs to transducers have a single current measurement and the ability to turn on and off the output to each individual transducer. By turning the transducers on one at a time, shutting it off again after each measurement to enable measuring the current to the next transducer, the current may be measured to each individual transducer—ensuring a more complete picture of the transducer current consumption. The strategy can also be to turn the outputs on one after the other, and calculating the difference in current consumption as the power outputs are turned on.

It will be appreciated that this technique may be used routinely, or may be used in response to a fault condition to identify the nature and location of the fault. For example, with all transducers active (the normal situation for an operating wind turbine generator), the current through the group of transducers (with all active) may be continuously measured. Only in the event that this measured current deviates from an allowable range, or in the case of a fault condition being identified in another way, will one (or more) of the above selective activation/deactivation strategies be implemented in order to identify which of the transducers is at fault. For example, if the control system identifies that there is a fault with a (to be identified) transducer, one sensor at a time could be switched off and the change in current identified (sequentially turning all sensors off) at least until the defective sensor is identified. A use-case for this function would be to identify a sensor that draws an unusually high or low current by sequentially excluding all active sensors until the defective sensor is identified. It will be appreciated that the normal scenario in a wind turbine generator is for all sensors to be powered during turbine operation. Due to this, the sequential de-energising may be a more practical way of identifying a defective sensor.

There are a number of ways of exploiting the current measurement capability, several of which are summarised below:

1) If the power supply line to a sensor is short-circuited to ground, for example due to a cable fault, the control system output providing that power will experience an overcurrent. This may cause the group of sensor power supply outputs associated with a common current measurement to shut down due to overcurrent. In this case the procedure for identifying the faulty sensor could be to initially turn off all outputs in that group and then reactivate (power up) one sensor at a time until overcurrent is detected. At this point, if the wind turbine generator is able to operate safely without the faulty sensor, it would be possible to isolate that sensor by turning off the output driver for that particular sensor power supply and subsequently continue wind turbine operation. An engineer can then be sent to repair the faulty sensor without the wind turbine generator needing to be deactivated in the meantime.

2) If a sensor does not work correctly, for example provides no signal, it can be caused by a broken sensor power supply wire to the sensor or by a faulty sensor. In this case, it can be verified if the power supply output from the control system is high (by the output feedback signal) and if it is, the sensor power supply output can be turned off and the change in current consumption measured. If the action causes no change in output current (for the group of sensors) then it is likely that the sensor power supply output has lost its connection to the sensor or the sensor itself is defective (since otherwise the sensor would consume an expected level of current).

3) In scenario 2 above it may be possible to utilise an "open load" current measurement to verify if the cable connection is broken. The test current for "open load" is very low (100 uA range). It is likely that a sensor, even if it is defective, will have a small current consumption. The combination of the ability to turn off the sensor power supply output and the ability to detect an "open load" in this state may therefore be useful in distinguishing between a wire fault and a faulty sensor.

It will be appreciated that the present technique includes any combination of turning power on to transducers in the wind turbine generator, to enable current consumption measurement on each individual transducer. The method provides current measurement on one channel to many transducers.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of measuring transducer currents in a wind turbine generator control system, the method comprising:
   selectively activating, via switching circuitry, a first set of one or more transducers in a group of transducers, wherein the switching circuitry comprises an output to each transducer of the group of transducers;
   taking, via a current measurement device connected to an input of the switching circuitry, a first measurement of current through the group of transducers;
   selectively activating, via the switching circuitry, a second set of one or more transducers in the group of transducers; and
   taking, via the current measurement device, a second measurement of the current through the group of transducers.

2. The method of claim 1, wherein each transducer of the group of transducers is a sensor or an actuator.

3. The method of claim 1, further comprising:
   activating a first transducer in the group of transducers, wherein the first transducer comprises the only activated transducer in the group of transducers,
   measuring current across the group of transducers, and
   deactivating the first transducer.

4. The method of claim 1, further comprising:
   activating a first transducer in the group of transducers, wherein a second transducer in the group of transducers is active; and
   measuring, across the group of transducers, a difference in current associated with activating the first transducer.

5. The method of claim 1, further comprising:
   deactivating a first transducer in the group of transducers, wherein a second transducer the group of transducers is active; and
   measuring, across the group of transducers, a difference in current associated with deactivating the first transducer.

6. A diagnostic apparatus for measuring transducer currents in a wind turbine generator control system, the apparatus comprising:
   switching circuitry comprising an output to each transducer in a group of transducers; and
   a current measurement device connected to an input of the switching circuitry, wherein the switching circuitry is configured to:
   selectively activate a first set of one or more of the transducers in the group of transducers, wherein the current measurement device takes a first measurement of current through the group of transducers while the first set of transducers is activated; and selectively activate a second set of one or more transducers in the group of transducers, wherein the current measurement device takes a second measurement of current through the group of transducers while the second set of transducers is activated.

7. A diagnostic apparatus according to claim 6, wherein the current measurement device and the switching circuitry form a first sensor diagnostic group, and wherein the apparatus further comprises a second sensor diagnostic group comprising a second current measurement device and second switching circuitry for measuring current through transducers of a second group of transducers.

8. A system, comprising:
a wind turbine, comprising:
a tower;
a nacelle disposed on the tower;
a generator disposed in the nacelle;
a generator control system communicatively connected to the generator;
a rotor mechanically coupled to the generator at a first end of the rotor;
a plurality of blades coupled to a second end of the rotor; and
a diagnostic apparatus for measuring transducer currents in the generator control system, the diagnostic apparatus comprising:
switching circuitry, for selectively activating and deactivating transducers in a group of transducers; and
a current measurement device, for measuring the current through the group of transducers; wherein:
the switching circuitry is configured to selectively activate a first set of one or more of the transducers in the group, whereupon the current measurement device takes a first measurement of the current through the group of transducers while the first set of transducers is activated; and
the switching circuitry is further configured to selectively activate a second, different, set of one or more transducers in the group of transducers, whereupon the current measurement device takes a second measurement of the current through the group of transducers while the second set of transducers is activated.

* * * * *